UNITED STATES PATENT OFFICE.

CARLETON ELLIS, OF LARCHMONT, NEW YORK, ASSIGNOR TO ELLIS-FORSTER COMPANY, A CORPORATION OF NEW JERSEY.

COMPOSITION FOR LAYING ROAD-DUST.

No. 865,578.　　　　　Specification of Letters Patent.　　　　　Patented Sept. 10, 1907.

Application filed May 27, 1907. Serial No. 375,806.

*To all whom it may concern:*

Be it known that I, CARLETON ELLIS, a citizen of the United States, and a resident of Larchmont, in the county of Westchester and State of New York, have invented certain new and useful Improvements in Composition for Laying Road-Dust, of which the following is a specification.

This invention relates to an improved composition of matter for laying street dust and preventing the occurrence of dust thereon and comprises waste sulfite cellulose liquor from paper mills preferably emulsified with oils, tar or similar oily matter.

Sulfite liquor of from say 20° to 30° Baumé is preferably employed although the exact strength of the liquor for this application is not of extreme importance. However for most purposes I prefer the liquor in a concentrated form nearly approaching the consistency of molasses.

An illustrative formula representing the preferred form of my invention consists of concentrated sulfite liquor and petroleum residuum or track oil emulsified together in about equal parts by agitation. The proportions may be considerably modified to meet different conditions. A sandy soil may require a larger proportion of oil while a heavy soil may call for sulfite liquor as the major constituent.

While oil alone has a tendency to form an unpleasant mud during a thaw the emulsion containing the sulfite liquor tends to give the soil great firmness. Furthermore the emulsion is sufficiently penetrating to produce effective impregnation even when the soil is damp from rains etc. The addition of deliquescent salts as calcium chlorid or magnesium chlorid is beneficial and an illustrative formula comprising a salt of this character consists of one gallon sulfite liquor, one and one half pounds of calcium chlorid and one gallon petroleum oil mixed and incorporated by stirring and beating. If desired the oil may be omitted especially when its petrolic odor is held as objectionable. A suitable formula for the preparation of such a composition consists of concentrated sulfite liquor one gallon mixed with magnesium chlorid of 8° Baumé one half gallon.

Obviously other salts than those described may be added but the ones mentioned are useful because of their hydroscopic nature. Non hydroscopic salts are not as useful in laying dust. I prefer the solution or composition to be substantially neutral for most applications but the results are occasionally more satisfactory when the composition is acid or alkaline. Apparently a calcareous road bed is adapted to a slightly acid composition while a peaty road bed often shows excellent results with an alkaline reacting composition. If acidified with hydrochloric acid the composition produces calcium chlorid when applied to limestone roads. Disinfecting material may also be added as for instance wood creosote, copper salts or other antiseptic material. The composition has a disinfecting action even without the addition of special antiseptics, especially if made with a considerable proportion of tarry matter.

My composition has the important advantage of cheapness as the raw materials are largely by-products of other industries.

The composition (diluted with water if desired) is applied by sprinkling or spraying on the road bed thereby impregnating the surface layers with a cementing and hardening compound which produces a firm surface resulting in dust free roads. It may be applied equally well to highways and railroad beds.

What I claim is;—

1. Composition for laying road dust comprising an emulsion containing waste sulfite liquor and a deliquescent salt.

2. Composition for laying road dust comprising an emulsion of concentrated waste sulfite liquor and an oily body.

Signed at New York in the county of New York and State of New York this 25th day of May A. D. 1907.

CARLETON ELLIS.

Witnesses:
GODFREY M. S. TAIT,
FLETCHER P. SCOFIELD.